United States Patent [19]

Addoms et al.

[11] 4,081,136
[45] Mar. 28, 1978

[54] DUAL MANIFOLD HIGH PERFORMANCE THROTTLEABLE INJECTOR

[75] Inventors: John F. Addoms, Penryn, Calif.; Charles B. McGough, Bonn-bad Godesberg, Germany

[73] Assignee: The United States of America as represented by the Secretary of the Air Force, Washington, D.C.

[21] Appl. No.: 761,508

[22] Filed: Jan. 21, 1977

[51] Int. Cl.² .............................................. F02K 9/02
[52] U.S. Cl. ........................... 239/127.1; 60/39.46 P; 60/258; 239/413; 239/417.5; 239/418; 239/553.3; 239/555
[58] Field of Search ................. 239/127.1, 132.5, 413, 239/417.5, 418, 549, 553.3, 553.5, 555, 556, 557, 562, 565, 568; 60/39.46 P, 39.74 A, 258

[56] References Cited

U.S. PATENT DOCUMENTS

| 3,000,184 | 9/1961 | Fish | 60/258 X |
| 3,605,408 | 9/1971 | McGough | 239/553.3 X |
| 3,612,397 | 10/1971 | Pearson | 239/568 X |
| 3,615,054 | 10/1971 | La Botz | 239/553.3 |
| 3,710,574 | 1/1973 | Pearson | 60/39.74 A X |
| 3,802,193 | 4/1974 | Wong | 60/258 |

Primary Examiner—Evon C. Blunk
Assistant Examiner—Andres Kashnikow
Attorney, Agent, or Firm—Joseph E. Rusz; Jacob N. Erlich

[57] ABSTRACT

A dual manifold propellant injector having at least four distinct platelets in its configuration. The first two platelets constituting the primary and secondary fuel platelets; the third and fourth platelets constituting the primary and secondary oxidizer platelets. By proper valve throttling, the injector is capable of providing homogeneous, intimately mixed propellants at all thrust levels.

10 Claims, 5 Drawing Figures

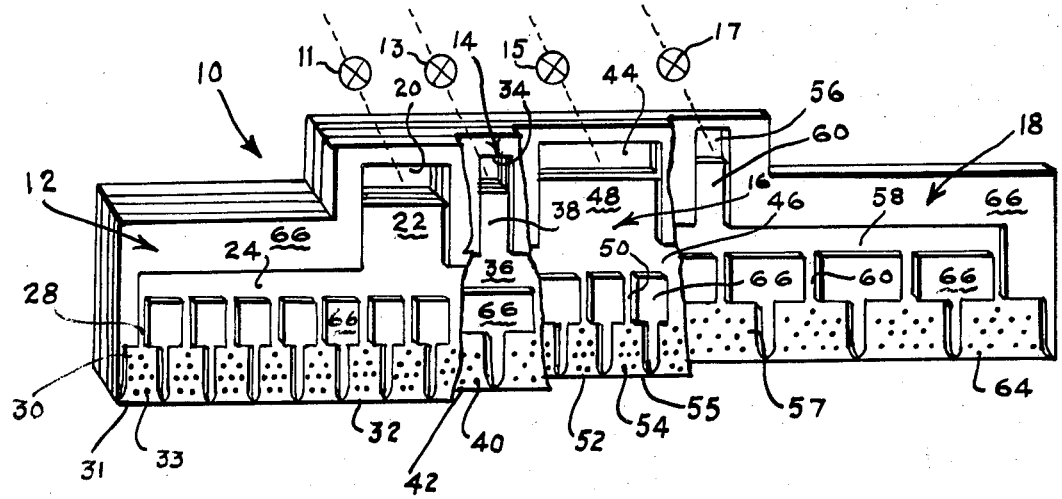
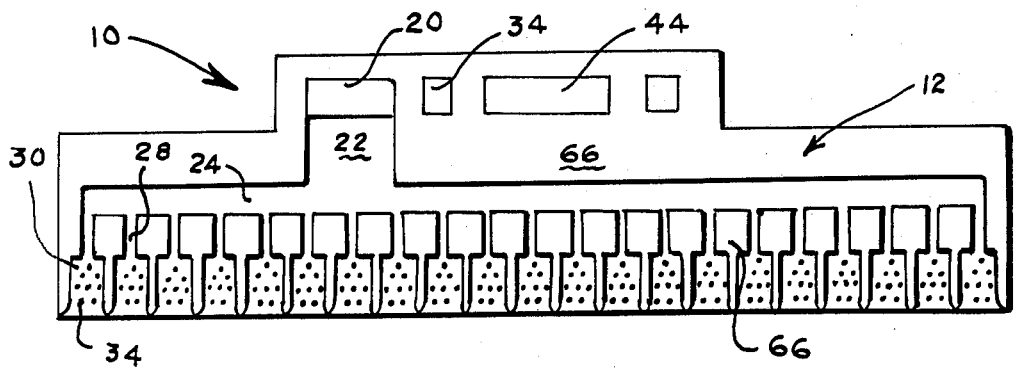

DUAL MANIFOLD HIGH PERFORMANCE THROTTLEABLE INJECTOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to injectors for rocket engines, and, more particularly to a dual manifold high performance throttleable injector.

The purpose of any rocket engine injector is to provide a means whereby the propellants; that is, the oxidizer and fuel are uniformly distributed, thoroughly mixed and atomized prior to vaporizing, igniting and combusting. Complete combustion must take place within a minimum of chamber volume for optimum efficiency. Injectors normally incorporate a manifolding system in which the propellants are physically distributed in specific areas adjacent to each other on the backside of the injector face. Orifices are then located into these areas to provide a "pattern" of oxidizer and fuel streams or sprays. The injection pattern is usually such that the fuel is in close proximity to the oxidizer at the proper mixture ratio; that is, the flow rate of the oxidizer with respect to that of the fuel must be constant at any incremental area of the injector face. The pattern of propellant orifices thus created, primarily determines the effectiveness of the combustion process.

In rocket engine injectors for introducing fuel and oxidant fluids into combustion chambers, the injectors have generally been classified as to the type of method of mixing or atomizing the fluids, and designated as impingement, spray, splash, premixing or showerhead pattern types. The impingement type of injectors consist of a number of separate holes arranged in such a manner that the resulting propellant streams of the fuel and oxidant intersect each other whereby a full stream of the fuel will impinge the oxidizer stream and break up into small droplets. In the spray or splash types of injectors, the injectors provide conical, cylindrical, or other type of spray sheets of propellant fluids which intersect each other and thereby atomize and mix. The premixing or non-impinging injector is one wherein the fuel and the oxidizer do not impinge but mix largely by diffusion of the propellant vapors and turbulence, that is, fine particles of fuel mix with oxidizer.

These prior methods of propellant mixing and atomization have certain inherent disadvantages. In the impingement type of injectors, for example, the droplet size is of considerable significance in that there is not always assurance of atomization and it is possible that the stream of oxidant will remain uncombined with the fuel or be misdirected against the combustion chamber wall. The spray, splash, and premixing type of injectors are not capable of providing the fine atomization and intimate mixing which is required in order to insure proper combustion at various flow rates of the oxidant and fuel into the combustion chamber for various rocket thrust levels.

U.S. Pat. No. 3,615,054 describes an injector which provides good atomization and intimate mixing over a wide range in flow rate of the oxidant and fuel into the combustion chamber by providing means for introducing the two fluids into the chamber whereby there is intimate mixing in the combustion chamber which is provided by an injector constructed of a plurality of discrete thin platelets or wafers joined together to form a unitary structure or module.

Unfortunately, even the injector set forth in U.S. Pat. No. 3,615,054 is deficient when it comes to yielding high performance over an extremely wide range of propellant flow rates. A major problem associated with throttling conventional liquid rocket engines by simply decreasing propellant flow by means of valves, is that the injector pressure drop decreases very rapidly as flow is reduced. As the systems hydraulic "stiffness" (injector pressure drop/chamber pressure) decreases rapidly, the inception of low frequency coupled combustion chamber/feed system instabilities become more likely.

SUMMARY OF THE INVENTION

The instant invention sets forth a dual manifold high performance throttleable injector which is an advanced or improved version of the throttleable injector described in U.S. Pat. No. 3,615,054. The injector of this invention is constructed of stacked ultrathin platelets with the injector face containing thousands of closely spaced propellant slots designed to give high performance over an extremely wide range of propellant flow rates. In permitting this wide range throttling capability the instant invention retains a sufficient high pressure drop across the injector face in order to inhibit low frequency combustion instability. The dual manifold feature of this invention permits more than a twenty-fold increase in injector face pressure drop at minimum thrust level, compared to the single manifold design of U.S. Pat. No. 3,615,054, and more than a forty-fold improvement over conventional injectors. During operation only simple valve throttling of the propellants is required, thus eliminating complex area variations, momentum exchange techniques and gas injector methods which typify other throttle injector designs.

It is therefore an object of this invention to provide an injector which results in a hydraulically "stiff" system and thereby permits continuous wide range throttling.

It is another object of this invention to provide an injector which retains system simplicity and complete cooling of the total face of the injector.

It is still another object of this invention to provide an injector which requires only simple valve throttling during its operation.

It is still a further object of this invention to provide an injector which is economical to produce and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DESCRIPTION OF THE DRAWINGS

FIG. 1 is a pictorial illustration, partially broken away, of the dual manifold high performance throttleable injector of this invention, showing conventional throttling valves schematically;

FIG. 2 is a front view of the primary fuel platelet of the injector of this invention;

DETAILED DESCRIPTION OF THE PREFERRED EMBODIMENT

Figure 3:
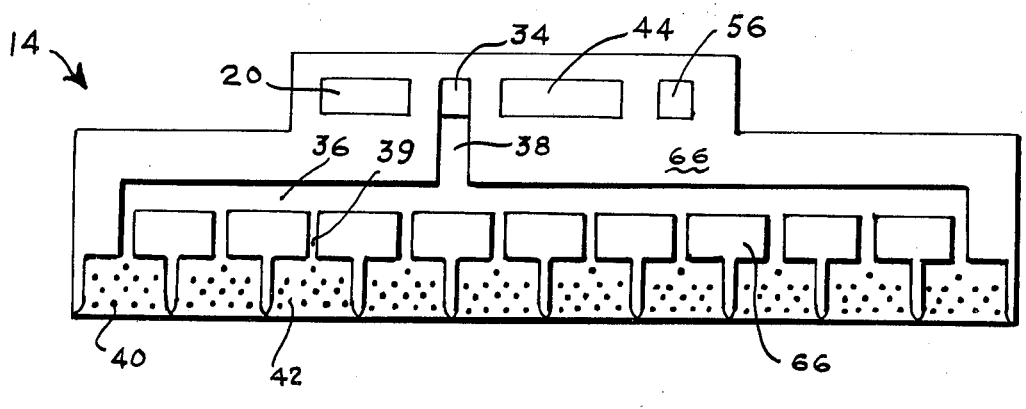
FIG. 3 is a front view of the secondary fuel platelet of the injector of this invention.

Injector 10 of this invention is an improved platelet-type injector which utilizes a dual manifold feature in order to provide wide range throttling capabilities. The basic concept of utilizing ultra-thin stacked platelets are described in U.S. Pat. No. 3,615,054. The instant invention improves thereupon by providing independently manifolded primary and secondary fuel platelets 12 and 14, respectively, and primary and secondary oxidizer platelets 16 and 18, respectively. Platelets 12, 14, 16 and 18 are stacked together in sequence as shown in FIG. 1 to form injector 10 while a plurality of stacked injectors 10 form an injector body similar to the injector body shown in U.S. Pat. No. 3,615,054. A plurality of conventional throttling valves 11, 13, 15 and 17, shown schematically in FIG. 1 regulate the fuel and oxidizer flow rate in a manner to be described in detail hereinbelow.

Each injector 10 is composed of four separate and distinct platelets 12, 14, 16 and 18. Reference is now made to FIG. 2 of the drawing, which best shows primary fuel platelet 12. The majority of the fuel (90-95% of the total fuel) flows from a primary fuel manifold 20 through an etched or embossed entrance region 22 within the planar surface of platelet 12 into a flow passage or fuel distribution plenum 24. Distribution plenum 24 is designed to be a low velocity, low pressure region which will provide an equal distribution of fuel across the entire length of primary fuel platelet 12. Regions 22 and 24 are areas which are partially etched through the planar surface of platelet 12. Fuel flows from the fuel distribution plenum 24 to flow restrictors or metering passages 28 and from there into the injector distribution regions 30 and out openings 31 in the edge or face 32 of platelet 12.

The purpose of the flow restrictors 28 is to accurately meter the flow to each injector opening 31 to provide precise mixture ratio control across the face 32 of injector 10. The divergent part or flared distribution regions 30 serve the function of providing a low resistance flow path in the region of which the flow will be subject to influence from the heat transfer conditions on the injector face 32. A plurality of islands 33 serve as separators between adjacent platelets 12, 14, 16 and 18 and are an integral part of the pattern of the platelet planar surface. Metering passages 28 are etched to a shallower depth than the remainder of the etched portions of the planar surface so as to provide a relatively high pressure drop thereacross. The operation of the injector platelet 12 as well as a description of platelets 14, 16 and 18 will be described in detail hereinbelow.

In the secondary fuel platelet 14 shown in FIG. 3 the fuel enters a secondary fuel manifold 34 of lesser cross-sectional area than manifold 20. Fuel flows from manifold 34 into the flow passage or platelet distribution plenum 36 via the plenum entrance region 38. The fuel is then distributed in essentially the same manner as described with reference to platelet 12, the difference being a fewer number of flow restrictors or metering passages 39 as well as upstanding elements or islands 40 thereby resulting in a lesser number of distribution regions 42. Approximately 5-10% of the total propulsion fuel flow will pass through the secondary fuel platelet 14 during full thrust operation.

Figure 4:
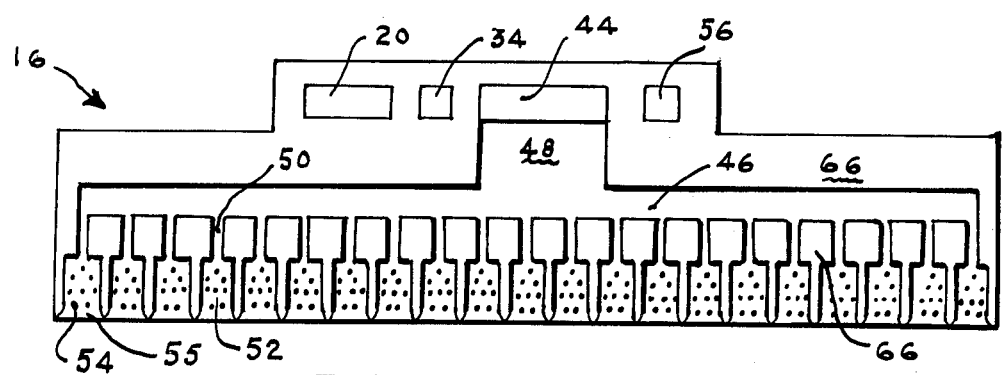
FIG. 4 is a front view of the primary oxidizer platelet of the injector of this invention.

Reference is now made to FIG. 4 which best shows the primary oxidizer platelet 16. Platelet 16, the primary oxidizer platelet, is similar in construction to platelet 12 shown in FIG. 2. The majority of the oxidizer flows through platelet 16 from the primary oxidizer manifold 44 which is slightly larger in cross sectional area than manifold 20. Oxidizer flowing from manifold 44 passes through the flow passage or oxidizer distribution plenum 46 via the plenum entrance region 48. The oxidizer then passes through flow restrictors or metering grooves 50; distribution regions 52; containing upstanding elements or islands 54; out the openings 55 and into the combustion chamber (not shown) where it burns with the fuel.

Figure 5:
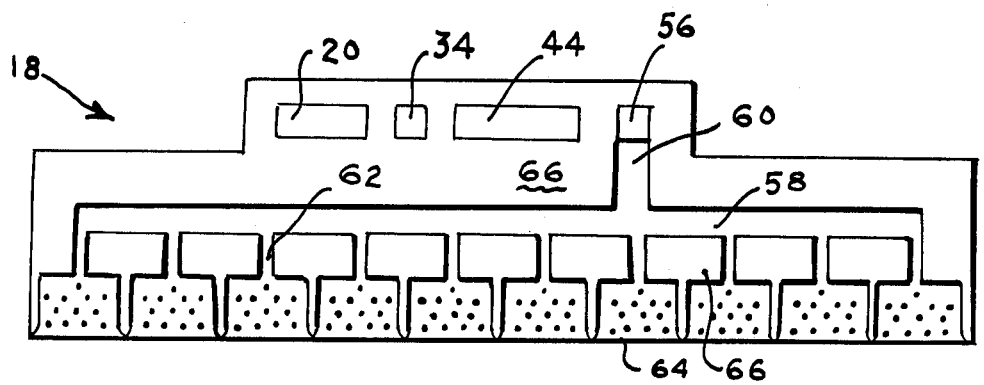
FIG. 5 is a front view of the secondary oxidizer platelet of the injector of this invention.

Platelet 18 shown in FIG. 5 of the drawing is the secondary oxidizer platelet and is similar in design and function to platelet 14. Approximately 5-10% of the oxidizer flows from the separately manifolded secondary oxidizer manifold 56 into the entrance of the flow passage or distribution plenum 58 by means of planum entrance region 60. Oxidizer then flows through the flow restrictors or metering grooves 62 and distribution regions 64 into the combustion chamber.

All unetched areas 66 of platelets 12, 14, 16 and 18 provide the bonding surface when the platelets are stacked sequentially in the manner shown in FIG. 1 of the drawing. Platelets 12, 14, 16 and 18 and their identical counter parts are stacked in order to form the entire body of the injector.

The individual platelets 12, 14, 16 and 18 may be formed in any one of several different ways. One way, known to those skilled in the art is photoetching. With photoetching, the thin metal sheet stack is imprinted with an acid-resistant ink which outlines all the flow passages. The sheet is then immersed in an acid bath which etches out the flow paths at a precisely known, predetermined rate. Several different depths of etch can be obtained on a single sheet of stock simply by repeating the above process with different patterns. In this way it could be possible to make the distribution plenums 24, 36, 46 and 58 considerably deeper than the flow restrictor passages 28, 30, 50 and 62 to obtain the proper distribution and pressure-drop characteristics. It should be pointed out, however that it may be equally possible to form the individual platelets either by embossing them or else by electroplating to form the raised areas rather than etching out the depressed areas.

Other means include, but are not limited to, the utilization of a crude etching process in making all but the metering or flow restrictor passages 28, 30, 50 and 62, which are later provided by a scribing process, similar to that used in preparing diffraction gratings. Grooving or channels also can be attained by conventional indentation processes or forming rolls. The means just described are well known to those skilled in the art.

Bonding of the platelets 12, 14, 16 and 18 together can also be accomplished in several ways. One method is to electroplate to the sheet stock a thin flashing of braze material prior to applying the acid resistant ink. The platelets then will end up with a coating of braze alloy on all the surfaces which contact the adjoining wafers, but with none in any passageway through which propellant flows. The entire injector body 10 can then be placed in a furnace and brazed together.

Other methods which might be used for joining the platelets together are diffusion bonding, resistance welding, or simply applying some advanced bonding agent to the contacting surfaces.

As a result thereof the injector face 32 is made up of thousands of extremely small fuel and oxidizer openings within the primary and secondary fuel and oxidizer platelets 12, 14, 16 and 18. These platelets are extremely thin that is 0.005 to 0.020 inches in thickness. Since it is desirable to have appreciable pressure drop at the low thrust range, the laminar flow characteristics of injector 10, wherein pressure drop is proportional to velocity to the 1.0 power, coupled with the dual-manifold features gives the instant invention a throttling capability range of 90:1 before the pressure drops to its minimal.

The operation of injector 10 of this invention only requires simple valve throttling. During operation of injector 10 at full thrust conventional oxidizer and fuel flow control valves 11, 13, 15 and 17 of a conventional rocket engine are open to allow full flow of the propellants into both pair of primary and secondary manifolds 20, 34, 44 and 56, respectively. At some later time the flow control valves are throttled to decrease the flow in both the primary and secondary manifolds. Since in injector 10 the flow is laminar through the injector platelets 12, 14, 16 and 18, the pressure drop decreases much more slowly than in conventional injectors of the past. When the pressure drop reaches the minimum desired value, for example, 30 psi, valves 11 and 15 regulating flow to both the fuel and oxidizer primary manifolds 20 and 44 are closed. This forces all of the propellant to flow through the secondary manifolds 34 and 56, thus substantially increasing the pressure drop across injector 10. The propellants now flow only out through the secondary manifolds 34 and 56, and cooling of all platelets 12, 14, 16 and 18 is accomplished by means of the secondary manifolds 34 and 56. The heat transfer conditions are now considerably less severe at the reduced chamber pressure, and all injector platelets 12, 14, 16 and 18 will be adequately cooled from one side by means of the secondary flow. As the oxidizer and fuel flow control valves are further throttled, the pressure drop in the secondary manifolds 34 and 56 decreases once more until it reaches the minimum allowable value. Pressure drop in injector 10 decreases much more slowly than in the conventional design and as a result thereof allows for a much larger throttling range.

The injector 10 of the instant invention by providing primary and secondary propellant manifolds 20, 44, 34 and 56, respectively, is capable of giving a high pressure drop at the lowest propellant flow rates required for operation therefore inhibiting low frequency instability. In addition, injector 10 provides excellent face cooling capability. The face 32 of the injector 10 is completely transpiration cooled at the higher thrust range while at low thrust during which only the secondary manifolds 34 and 56 are in operation the platelets 12, 14, 16 and 18 are cooled by the propellants from only one side. The end result of homogeneous, intimately mixed propellants at all thrust levels, provides excellent performance and eliminates potential problems of compatibility within ablative thrust chambers.

Although the invention has been described with reference to a particular embodiment, it will be understood to those skilled in the art that the invention is capable of a variety of alternate embodiments within the spirit and scope of the appended claims.

We claim:

1. An injector for uniformly distributing propellant within the combustion chamber of a rocket engine comprising at least four platelets, each of said platelets having planar surfaces and edge surfaces, one of said planar surfaces of each of said platelets containing a plurality of flow passages therein, said flow passages terminating at said edge surface in an opening in said edge surface, said platelets being joined together in a stack to form a unitary structure, the first of said platelets having means therein adapted to receive a predetermined quantity of fuel, the second of said platelets having means therein adapted to receive less than said predetermined quantity of fuel, the third of said platelets having means therein adapted to receive a predetermined quantity of oxidizer, the fourth of said platelets adapted to receive less than said predetermined quantity of oxidizer, each of said first and second platelets having means therein for operatively connecting said fuel receiving means to said flow passages, each of said third and fourth platelets having means therein for operatively connecting said oxidizer receiving means to said flow passages and each of said platelets having flow restrictors therein operatively connected to said flow passages for metering flow of propellant to each of said edge surface openings thereby providing homogeneous, intimately mixed propellants at all thrust levels.

2. A propellant injector as defined in claim 1 wherein said first and third platelets have a greater number of edge openings than said second and fourth platelets.

3. A propellant injector as defined in claim 1 wherein said fuel and oxidizer receiving means of said first and third platelets, respectively, are larger in cross-sectional area than said fuel and oxidizer receiving means of said second and third platelets, respectively.

4. A propellant injector as defined in claim 3 wherein said fuel receiving means of said first platelet and said oxidizer receiving means of said third platelet constitute the primary manifolds of said injector.

5. A propellant injector as defined in claim 4 wherein said first and third platelets have a greater number of edge openings than said second and fourth platelets.

6. A propellant injector as defined in claim 5 wherein said flow restrictors are of a shallower depth within said planar surfaces of said platelets than said flow passages thereby providing for a relatively high pressure drop thereacross.

7. A propellant injector as defined in claim 6 wherein said fuel receiving means of said second platelet and said oxidizer receiving means of said fourth platelet constitute the secondary manifolds of said injector.

8. A propellant injector as defined in claim 7 wherein the cross-sectional area of said primary oxidizer manifold is larger than the cross-sectional area of said primary fuel manifold.

9. A propellant injector as defined in claim 8 wherein said platelets further comprise flared distribution regions interposed between said flow restrictors and said edge surface openings.

10. A propellant injector as defined in claim 9 wherein said distribution regions of said second and fourth platelets are larger in size than said distribution of said first and third platelets.

* * * * *